US012537706B2

(12) United States Patent
Clark et al.

(10) Patent No.: US 12,537,706 B2
(45) Date of Patent: *Jan. 27, 2026

(54) CHAT CHANNEL HIGHLIGHTS

(71) Applicant: Zoom Video Communications, Inc., San Jose, CA (US)

(72) Inventors: Jason Clark, Evergreen, CO (US); Benjamin Gareth Dove, Issaquch, WA (US); Amanda Naomi Etheridge, Georgetown, TX (US); Li-An Huang, San Francisco, CA (US); Robert Allen Ryskamp, Mountain View, CA (US); Adam Justin Spooner, Greensboro, NC (US); Matthew Brandon Wesson, Lafayette, CO (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,591

(22) Filed: Dec. 7, 2023

(65) Prior Publication Data
US 2024/0163126 A1 May 16, 2024

Related U.S. Application Data

(63) Continuation of application No. 17/977,879, filed on Oct. 31, 2022, now Pat. No. 11,863,335.

(51) Int. Cl.
*H04L 12/18* (2006.01)
*H04L 51/216* (2022.01)
(52) U.S. Cl.
CPC ........ *H04L 12/1822* (2013.01); *H04L 51/216* (2022.05)

(58) Field of Classification Search
CPC .......................... H04L 12/1822; H04L 51/216
See application file for complete search history.

(56) References Cited

U.S. PATENT DOCUMENTS 7,426,540 B1    9/2008  Matsumoto et al.
9,882,846 B1 *  1/2018  Cohen ................. H04L 65/1069
(Continued)

OTHER PUBLICATIONS

EP International Search Report and Written Opinion for PCT/US2023/031647 mailed Jan. 5, 2024.
(Continued)

*Primary Examiner* — Raqiul A Choudhury
(74) *Attorney, Agent, or Firm* — Kilpatrick Townsend & Stockton, LLP

(57) ABSTRACT

Systems and methods for providing spotlight cards within a chat channel are provided. In an aspect, a method includes establishing, by a video conference provider, a first chat channel for exchanging chat messages between a plurality of client devices and receiving, by the video conference provider, an indication to generate a first spotlight card within the first chat channel, wherein the indication identifies spotlight content from a first resource external to the first chat channel. The method also includes generating, by the video conference provider, the first spotlight card identifying the spotlight content and transmitting, by the video conference provider to one or more of the client devices connected to the first chat channel, the first spotlight card for display within a spotlight panel within the first chat channel, the spotlight panel positioned proximate to a chat messaging panel including chat messages posted to the chat channel.

20 Claims, 10 Drawing Sheets

(56) References Cited

U.S. PATENT DOCUMENTS

| | | |
|---|---|---|
| 2017/0336928 A1 | 11/2017 | Chaudhri et al. |
| 2018/0247274 A1 | 8/2018 | Lipendin |
| 2018/0337968 A1 | 11/2018 | Faulkner |
| 2021/0136028 A1* | 5/2021 | Clarke .................... H04L 51/02 |
| 2021/0336912 A1 | 10/2021 | Ahn et al. |
| 2022/0070133 A1* | 3/2022 | Santo .................... H04L 51/043 |
| 2022/0292732 A1 | 9/2022 | Leacock et al. |
| 2023/0004277 A1 | 1/2023 | Lowry et al. |
| 2023/0047600 A1 | 2/2023 | Kim |

OTHER PUBLICATIONS

"Add an App to Microsoft Teams", Available Online at: https://support.microsoft.com/en-us/office/add-an-app-to-microsoft-teams-b2217706-f7ed-4e64-8e96-c413afd02f77, Oct. 14, 2022, 8 pages.

* cited by examiner

CHAT CHANNEL HIGHLIGHTS

RELATED APPLICATIONS

The present application is a continuation of U.S. application Ser. No. 17/977,879, filed on Oct. 31, 2022, now U.S. Pat. No. 11,863,335, entitled, "Chat Channel Highlights," the entirety of which is incorporated by reference herein.

FIELD

The present application generally relates to videoconferences and chat channels, and more particularly relates to systems and methods for providing spotlight cards within a chat channel.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
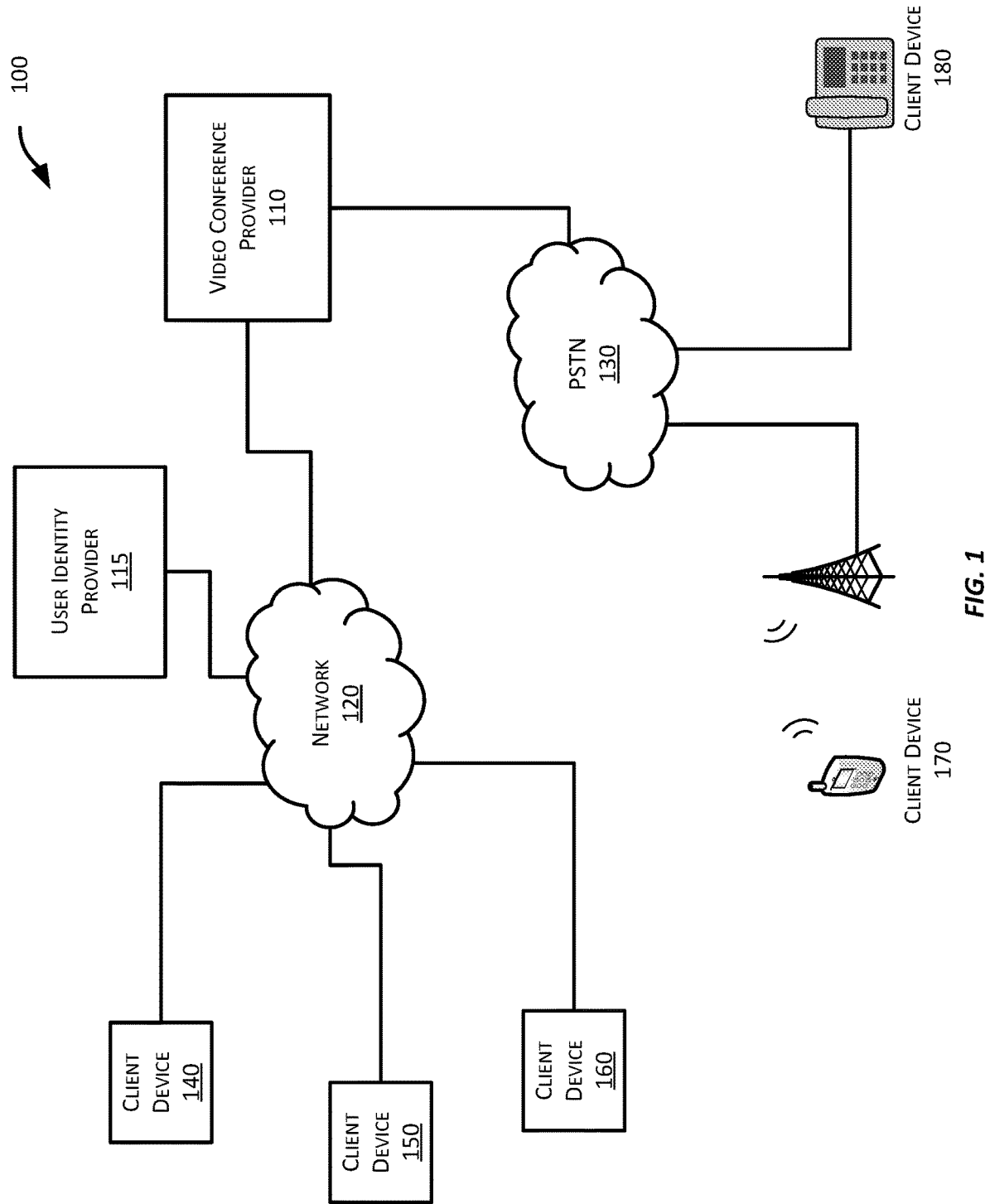
FIGS. 1 and 2 show example systems for providing spotlight cards within a chat channel, according to an embodiment herein.

Examples are described herein in the context of systems and methods for providing spotlight cards within a chat channel. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Chat messaging has become a fixture of modern communication. In particular, chat channels are used across numerous platforms, especially within work environments as a means of providing swift and easy communication between individuals. A chat channel involves an application that allows multiple participants to exchange messages, including sharing documents, text messages, audio clips, etc., with other members of the chat channel. Unlike email communication, however, a chat channel generates a running dialogue of messages that are exchanged within the chat channel. As such, chat channels can accumulate thousands of messages, especially, if the chat channel involves a high number of members. The high volume of messages within a chat channel can make it cumbersome for members to identify relevant or important information within the chat channel.

To provide chat channel members quick review and access to important and relevant content within a chat channel, example spotlight cards are provided herein. Spotlight cards can include important information for the chat channel that a hosting member, or a member with authority to generate spotlight cards, flags the information as important. A spotlight card may be positioned within a spotlight panel of the chat channel that is continuously visible while a member is in a chat channel, regardless of where in the chat channel the member scrolls. This may allow the spotlight cards to highlight the importance of the spotlight content contained within the spotlight card. For example, a host member may generate a spotlight card for a chat message that is a reminder to the chat channel members to meet a submission deadline. Since it is important that the chat channel members meet the submission deadline, the spotlight card may be positioned in the spotlight panel to highlight its importance and serve as a constant reminder to all chat channel members regardless of where the member is within the chat channel.

Another issue that arises from chat channels is the limited accessibility of other applications. Often, when a chat channel is used within a business or educational setting, members of that chat channel will also use other applications in conjunction with the chat channel. For example, chat channel members may be part of a project team and use another application for work on the project documents. To work in the project documents, the chat channel members must leave the chat channel and open the separate application. Not only is this time consuming but it can also interrupt members' focus or ability to recall what is happening in the chat channel. For example, if there is a request in the chat channel for specific information that is only present in the project documents, a chat channel member may navigate to the application hosting the project documents but forget the details of the request by the time he or she opens the project documents. This may require the member to toggle between the chat channel and the project document application, impacting the experience and focus of the member within the chat channel.

To provide access and the ability to interact with resources external to the chat channel, example spotlight cards are provided herein. As discussed above, spotlight cards can be used to highlight important or relevant information for members of a chat channel. In some cases, the important or relevant information may be hosted by a resource, such as an application, that is separate or external from the chat channel. To highlight information that is hosted by the external resource, a spotlight card may be generated. In this case, the spotlight card can provide easy access to the resource without leaving the chat channel. For example, if a project document is hosted by a word processing application, a spotlight card of the project document may be generated and posted in the spotlight panel of the chat channel. If a member wants to preview or access the contents of the project document, the member can simply view or select the spotlight card. As will be described in greater detail below, the member can preview the contents of the project document from the spotlight card or can expand spotlight card to access the project document. In some embodiments, a member can actively work in the project document, such as by editing the project document, without leaving the chat channel. This can allow chat channel members to remain engaged in a chat channel discussion while accessing relevant content that is hosted by external resources.

Importantly, in some embodiments, the spotlight cards are dynamic and continuously update in real-time with information as it is updated in the external resource itself. For example, if sales numbers are being updated in a finance application that is separate and external from the chat channel, a corresponding spotlight card for the sales numbers may also update to reflect the content as it is present in the finance application. This can ensure that the spotlight cards provide relevant and correct content to the chat channel members.

Not only can a single chat channel become overwhelming with the volume of content within the chat channel, but members can become overwhelmed by being part of numerous chat channels. For example, a single member may be part of a dozen or more chat channels, each containing a high volume of messages and content. For the purposes of this disclosure, this type of member may be referenced as a multi-channel member. Not only would it be time consuming, but it could even be impossible for a multi-channel member to identify the most recent and relevant information for each of the channels, especially when content is continuously being updated and generated.

To provide a multi-channel member easy access and review of the most recent and relevant information across numerous chat channels, example spotlight home pages are provided herein. A spotlight home page may aggregate the spotlight cards from across multiple chat channels in a simple display for ease of review and access. Additionally, the spotlight home page may identify content in each chat channel that is relevant to the multi-channel member, such as a spotlight thread (e.g., a thread with a high number of replies or messages) or message that mentions the multi-channel member. By aggregating important and relevant information from numerous chat channels in a single place, the multi-channel member can remain up-to-date on the important content of each channel, as well as easily access the content within the relevant chat channel simply upon selecting the spotlight card.

This illustrative example is given to introduce the reader to the general subject matter discussed herein and the disclosure is not limited to this example. The following sections describe various additional non-limiting examples and examples of systems and methods for providing spotlight cards within a chat channel.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
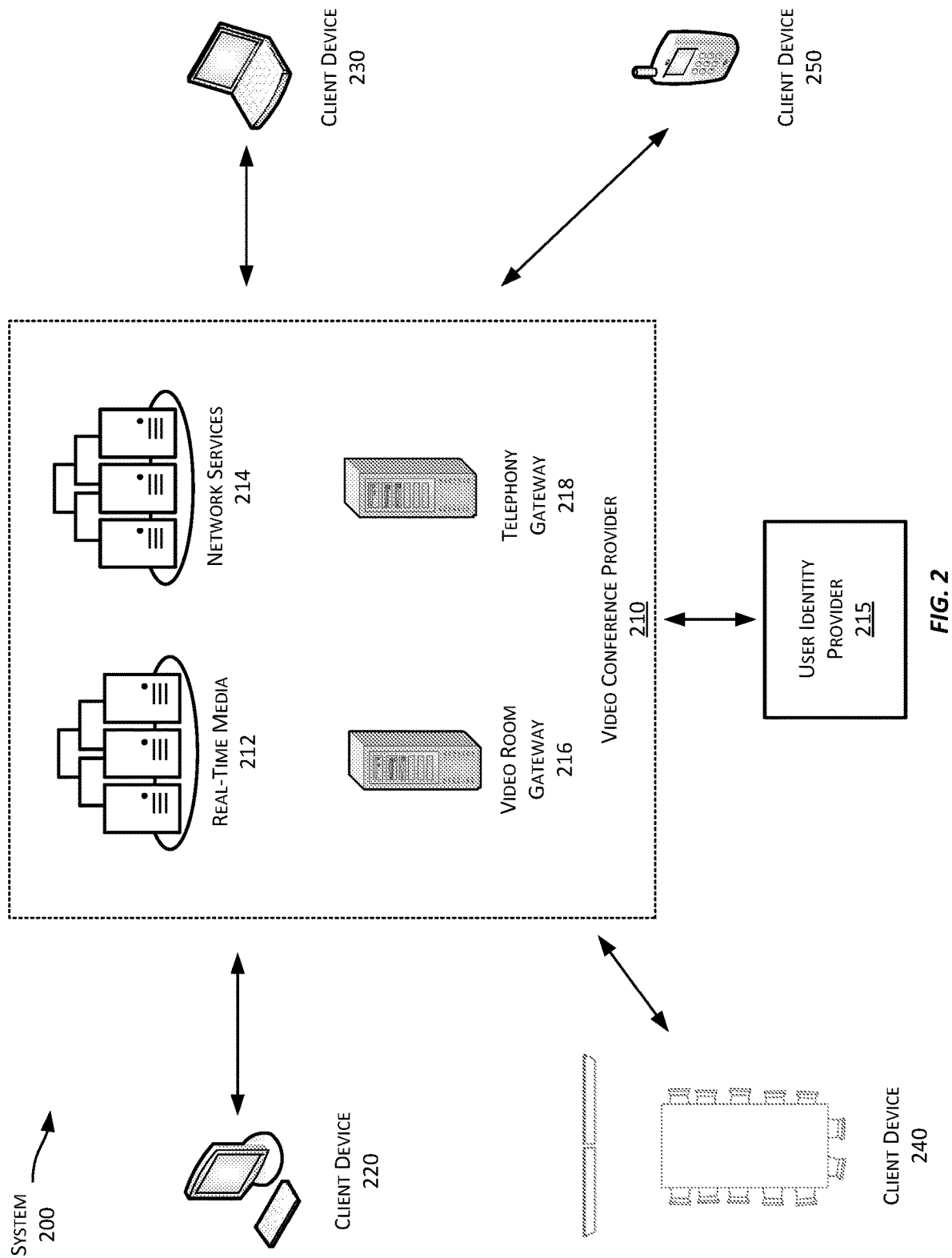

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different Examples of video conference functionality, thereby enabling the various client devices to create and participate in video conference meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosed by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality describe above, the chat and video conference provider 210 (or the chat and video conference provider 110) may provide a chat functionality. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
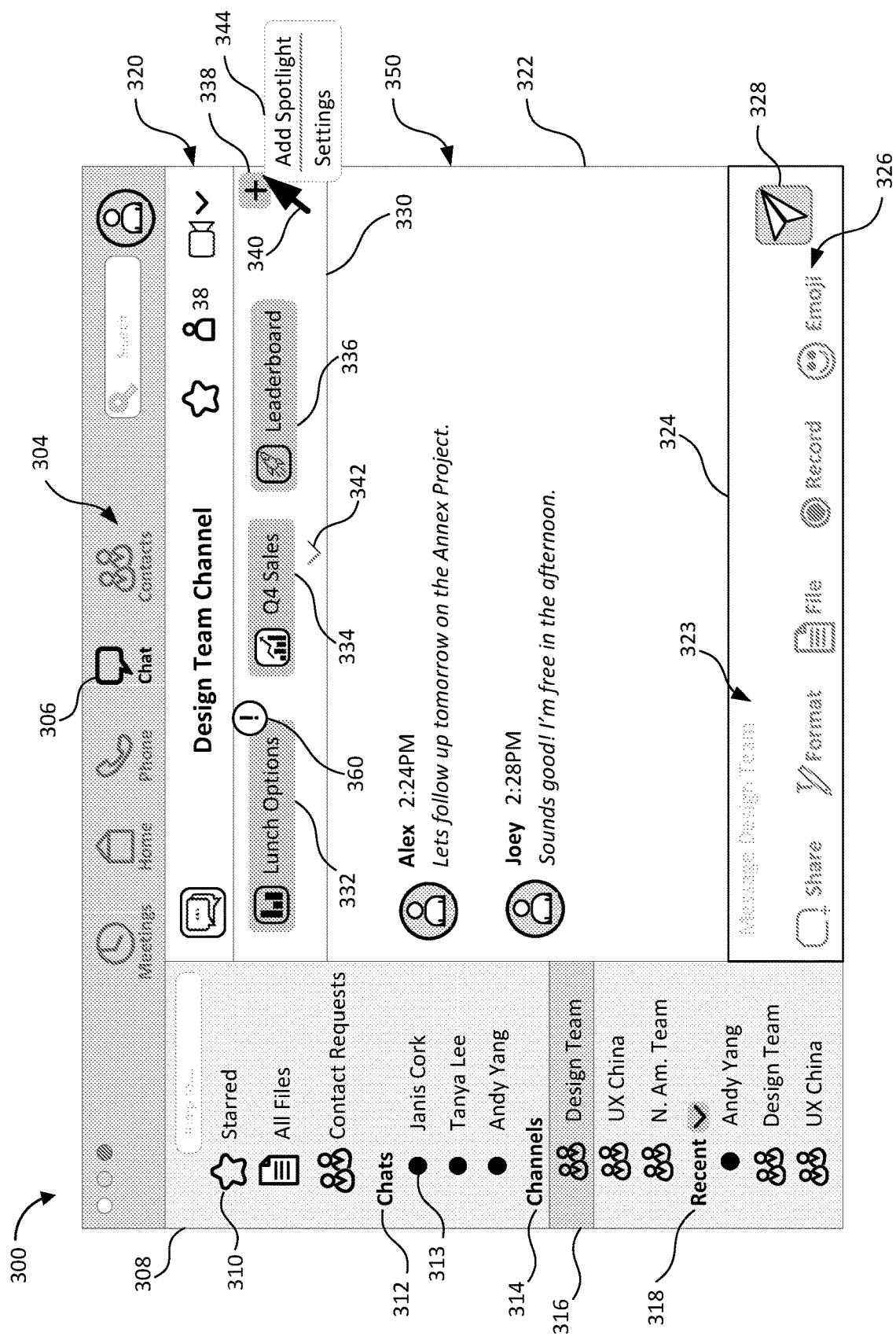
FIG. 3 illustrates an example master chat panel including a spotlight panel, according to an embodiment herein.

Referring now to FIG. 3, FIG. 3 shows an example chat channel 322 including a spotlight panel 330, according to an embodiment herein. The chat channel 322 may be accessible through a master chat panel 300. The master chat panel 300 may be displayed on a client device, such as the client device 220, in response to information sent by a chat and video conference provider, such as the chat and video conference provider 110 in FIG. 1. The master chat panel 300 may be generated by an application, e.g., a standalone chat client or integrated into a video conferencing application, run by one or more processors stored on the client device.

The master chat panel 300 may include a general dashboard 304, a chat control dashboard 320, a sidebar 308, a chat window 350, a reply dashboard 326, and a reply panel 324. The general dashboard 304 may include one or more buttons or links that switch functionalities and/or views of the master chat panel 300. For example, FIG. 3 shows a chat view, perhaps in response to a user command selecting a chat button 306 in the general dashboard 304. In this view, the chat window 350, the reply panel 324, and other components illustrated in FIG. 3 may be displayed on the client device. In other examples, a contacts button may be selected by a user. In response the contacts button being selected, the chat window 350, the reply dashboard 326 and the reply panel 324 may be replaced by a display of a contacts window including a list of user contacts associated with the user of the client device. The sidebar 308 may be displayed alongside the contacts window. Other configurations are also possible. Various buttons on the general dashboard 304 may correspond to various displays of windows being displayed on the client device. Any number of components shown in FIG. 3 may be displayed on the client device with any of the various windows. Similarly, any of the components may cease to be displayed in accordance with any of the windows.

The sidebar 308 may include one or more chat channel headings, such as chats 312, channels 314, and recent 318. Chats 312 heading may include one or more chat channels, such as chat channel 313. The chats 312 may include private chat channels, where messages in a chat channel are exchanged in a one-on-one manner. For example, the chat channel 313 may be between the member viewing the master chat panel 300 and one other member, such as Janis Cork, as depicted. Messages exchanged via the chat channel 313 may only be accessible by the members of the chat channel 313. One-on-one chat channels, such as those provided under the chats 312 heading may allow members to securely communicate with each other or track communications between themselves.

The channels 314 heading may be for chat channels that include two or more users. For example, a chat channel 316 may be included under the channels 314 heading because the chat channel 316 is for a Design Team. The chat channel 316 may include two or more members who have access to send and receive messages within the chat channel 316. In some examples, the chat channel 316 may only be accessed by members who have permission to enter the chat channel 316, such as members who receive and accept an invitation to join the chat channel 316. In some embodiments, a chat channel may have a host or member who has host controls over the chat channel. For example, host controls may include the ability to establish and invite members to a chat channel. Additionally, as will be described in greater detail below, host controls may also grant a member the ability to generate and pin a spotlight card within a spotlight panel 330.

The recent 318 heading may indicate chat channels that a viewing member of the master chat panel 300 has recently viewed. The recent 318 heading may allow the viewing member easy access to commonly or recently viewed or accessed chat channels. "Recently accessed" chat channels may be determined by the client device to be a fixed number of most recent channels accessed by the viewing member, or may be only those chat channels access within a certain time, calculated from the current time.

Although only the chat channel headings 312, 314, and 318 are shown, other chat channel headings are possible. For example, some examples may include a chat channel heading that displays, on the client device, only those channels that the user associated with the client device is a member of that have been recently accessed.

The sidebar 308 may also include one or more combinatory headings, such as starred combinatory heading 310. A combinatory heading may aggregate one or more messages from one or more chat channels, according to a predetermined criterion. The combinatory headings may include a link that, in response to a user command, cause the client device to display one or more messages in the chat window 350. The messages may be gathered from one or more chat channels, such as the chat channels 312 or 316, and displayed based on predetermined criteria. In FIG. 3, for example, the starred combinatory heading 310 may gather only those messages that have been marked by a user of the client device. The marked messages may be stored at the client device, and/or may be stored at the chat and video conference provider. The link may cause the one or more processors included on the client device to determine which messages are marked messages and cause them to be displayed in the chat window 350. In some examples, the link may cause the client device to send a signal to the chat and video conference provider. The chat and video conference provider may then determine which messages are marked messages and send information to the client device to generate a display of the marked messages in the chat window 350.

Other combinatory headings (and associated links and functionality) are also considered. Other examples may include an unread heading, an all files heading, a contact request heading, and others. As with the starred combinatory heading 310, an associated link may cause the client device and/or the chat and video conference provider to determine which messages (if any) meet predetermined criteria associated with the combinatory heading and subsequently display those messages on the client device.

As depicted, a viewing participant of the master chat panel 300 may select to access the chat channel 316 for the Design Team. Upon selection of the chat channel 316, the chat window 350 may be provided on the master chat panel 300. The chat window 350 may include the chat control dashboard 320. The chat control dashboard 320 may display one or more control buttons and/or information regarding the chat channel 316 (e.g., the currently viewed chat channel). The control buttons may include links that mark a message (e.g., to mark it such that it is determined to be a marked message via the starred combinatory heading 310), begin a video conference, schedule a meeting, create a video message, or other tasks. The chat control dashboard may also include a title of the chat channel 316 currently being displayed on the client device, such as the "Design Team Channel" as depicted, and/or a number of users with access to the chat channel 316. One of ordinary skill in the art would recognize many different possibilities and configurations.

The chat window 350 may also include a reply panel 324. The reply panel 324 may include an input field 323, where the member can input a message and select to send the message to the chat channel 316. The input field 323 may be accessed by a peripheral device such as a mouse, a keyboard, a stylus, or any other suitable input method. In some examples, the input field 323 may be accessed by a touchscreen or other system built into the client device. In some examples, a notification may be sent from the client device and/or the chat and video conference provider that indicates a response is being entered into the input field 323 by the user. In other examples, no notification may be sent.

The reply dashboard 326 may include one or more buttons that, in response to a user command edit or modify a response input into the input field 323. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 326. The one or more formatting buttons may change the appearance of a reply entered in the input field 323. The user may thereby edit and customize their response in the input field 323 before sending.

The reply dashboard 326 may include a send button 328. The send button 328 may, in response to a user command, cause the client device to send the contents of the input field 323 (or "message") to the other members of the chat channel 316. The client device may transmit the message to the chat and video conference provider 210, which may in turn transmit the message to the client devices associated with the other members of the chat channel 316. Upon transmission of the message via the send button 328, the message may be published within a chat messaging panel 322. As noted above, messages exchanged within the chat channel 316 may include image files, such as JPEG, PNG, TIFF, or files in any other suitable format, may also include video files such as MPEG, GIF, or video files in any other suitable format, or may also include text entered into the input field 323 and/or other files attached to the message such as a PDF, DOC, or other file format.

As illustrated, the chat window 350 may include the chat messaging panel 322 and a spotlight panel 330. The chat messaging panel 322 may display messages as they are exchanged between members of the chat channel 316. The messages may be displayed in the chat messaging panel 322 in real-time. The chat messaging panel 322 may include all messages that are exchanged within the chat channel 316 since the generation of the chat channel 316. As could be appreciated, by holding all messages that are exchanged between members of the chat channel 316, the chat messaging panel 322 may include a large volume of messages. Not only could a large volume of messages be generated if the chat channel 316 is active for a long duration of time or includes a large number of members, but also if the members of the chat channel 316 are increasingly communicative.

When the chat messaging panel 322 includes a large volume of messages, it can be difficult for members of the chat channel 316 to identify or easily view relevant or important content. For example, a message that is important to the members of the chat channel 316 may be exchanged on a Monday and by Wednesday there may be so many messages exchanged after the important message is posted in the chat messaging panel 322 that a member cannot find the important message without spending time and effort sorting through the content of the chat messaging panel 322.

To highlight relevant or important content of the chat channel 316 for members, one or more spotlight cards 332-336 may be generated and added to the chat channel 316. As illustrated, the chat channel 316 includes three spotlight cards: a first spotlight card 332, a second spotlight card 334, and a third spotlight card 336. The spotlight cards 332, 334, and 336 may be generated within a spotlight panel 330. The spotlight panel 330 may be positioned proximate to the chat messaging panel 322 so that members can continuously view the spotlight cards 332, 334, and 336 as they view messages within the chat messaging panel 322. In some embodiments, the spotlight panel 330 may be a persistent panel within the chat window 350 meaning that the spotlight panel 330 is always present when a member is in the chat channel 316. For example, a member may scroll through the messages in the chat messaging panel 322 but the spotlight panel 330 may maintain its position within the chat window 350.

Each of the spotlight cards 332, 334, and 336 may include spotlight content. Spotlight content may include content that is important or relevant to the chat channel 316. For example, in some embodiments, the spotlight content may include an important message that was previously exchanged within the chat channel 316 that a host or other member with authorization wants to highlight as important to the other members of the chat channel 316.

In some embodiments, the spotlight content may include content from a resource external to the chat channel 316. A resource external to the chat channel 316 may include an application or information that is not available directly from the chat channel 316. For example, the spotlight card 334 may include Q4 sales numbers from a finance application. The finance application may be separate from the chat channel 316 and thus a resource external from the chat channel 316 (e.g., an external resource). As another example, the spotlight card 336 may include information on a leaderboard for the Design Team. The spotlight card 336 may include information on the leaders of the Design Team, such as contact information or profile information for the leaders. In some embodiments, the spotlight content of the spotlight card 336 (e.g., the contact information or profile information) may be pulled from contact or profile information for each of the respective leaders stored with the chat and video conference provider. Since the contact or profile information is stored separate from the chat channel 316, the contact or profile information may be considered to be an external resource. In some embodiments, a widget or link may be used to access and pull content from an external resource (such as the contact or profile information from the chat and video conference provider or the finance information from the finance application). Examples of external resources may include applications, websites, content that is hosted by the video conference provider 210, such as a calendar or email application hosted by the video conference provider 210, applications, websites, content that is not hosted by the video conference provider 210, such as a word processing application, email service hosted by a third party, or a news website, or content or features that are native to the video conference provider 210, such as contact or profile information associated with members that are part of the video conference provider 210.

To generate a new spotlight card, a member of the chat channel 316 may select a "plus" button 338 within the spotlight panel 330. For example, the member may use a cursor 340 to select the plus button 338. In some embodiments, upon selecting the plus button 338 a window 344 may be presented. The window 344 may provide an option to add spotlight card and a settings option. The settings options may provide various options for generating a spotlight card. For example, settings may include what members of the chat channel 316 have authorization to generate a spotlight card. In some embodiments, only members with host controls, such as a host, co-host, or a member assigned host controls over the chat channel 316 may be able to generate a spotlight card.

In other embodiments, instead of the button 338, a spotlight card may be generated from content exchanged within the chat messaging panel 322. For example, a member may select the content, right click, and be provided with an option to "add as spotlight card." In another scenario, a member may drag and drop content into the spotlight panel 330 to generate a spotlight card. In still another scenario, if a member is adding an application to the chat channel 316, the member may be prompted an option to add the application or content from the application as a spotlight card.

Spotlight cards may be generated based on predetermined criteria within the chat channel 316. For example, if a thread within the chat channel 316 has more than a threshold number of replies, then a spotlight card may be generated based on this thread for quick access by the chat channel members. In some embodiments, a member may generate a spotlight card with other members of the chat channel 316. In some cases, the spotlight card may be shared with individual members or with the entire chat channel 316. This can allow a generating member to limit the sharing of a spotlight card if, for example, the spotlight card contains sensitive information/data.

In some embodiment, when generating a spotlight card, the generating member may select the "add spotlight" option on the window 344. From there, the generating member may be presented with a prompt (not shown) to identify the external resource from which the spotlight content of the spotlight card may be drawn. The generating member may then indicate the external resource and the spotlight content within the external resource, in some cases navigating into the external resource to identify the spotlight content for the spotlight card. For example, to generate the spotlight card 334, the generating member may indicate that the finance application is the external resource and may navigate into the finance application to indicate that the Q4 sales figures are the spotlight content for the spotlight card. In some embodiments, the spotlight content of the spotlight card may include a preview of the content of an external resource, such as a preview of a shared document, or the spotlight content may be specific content within the external resource, such as only the Q4 sales figures from the finance application. A generating member may indicate the spotlight content when generating a spotlight card.

The spotlight content of each of the spotlight cards 332, 334, and 336 may update as the content of the external resource updates. For example, if the Q4 sales figures of the spotlight content associated with the spotlight card 334 update in the finance application, the spotlight card 334 may update to reflect the most recent Q4 sales figures. In some embodiments, the spotlight card 334 in a simplified view, as illustrated by FIG. 3, displays a quick view of the spotlight content. For example, the simplified view of the spotlight card 334 may display a header of what the spotlight content is, such as "Q4 Sales." As will be described in greater detail below with respect to FIGS. 4-6, in other embodiments, the spotlight card 334 may provide more spotlight content when in an expanded view or detailed view.

In some embodiments, a display of the spotlight cards 332, 334, and 336 may visually change to indicate an update of the corresponding spotlight content. For example, in some embodiments, the spotlight card 332 may change color or size, may toggle, may include a notification bubble 360, or otherwise visually change to indicate an update to the spotlight content. Following the example spotlight card 332, if the spotlight content of the spotlight card 332 is a poll for lunch options, then the spotlight card 332 may visually change to indicate a poll count change as members of the chat channel 316 vote on the various lunch options. In some embodiments, a notification bubble 360 may be provided on the spotlight card 332 to indicate that the poll is closing soon or that the viewing member has not completed the polling questions corresponding to the spotlight content.

As depicted, the spotlight cards 332, 334, and 336 may be positioned within the spotlight panel 330. As can be appreciated, if there are numerous spotlight cards, not all of the spotlight cards 332, 334, and 336 may be visible within the spotlight panel 330 at a time. If there is a large number of spotlight cards, the spotlight panel 330 may include a scroll (not shown) for viewing off-screen spotlight cards. In some embodiments, the spotlight cards 332, 334, and 336 (and other spotlight cards if present) may be positioned within the spotlight panel 330 based on a priority. A priority of a given spotlight card may be based on a number of factors, such as how recently the spotlight card was generated (e.g., the more recent cards may have a high priority for placement within the spotlight panel 330), a time sensitivity of the spotlight content of a given spotlight card (e.g., the spotlight content is a poll or questionnaire that is timing out soon may have a high priority), or the member who generated the spotlight card (e.g., if a host generated the spotlight card, then the spotlight card may have a higher priority over a spotlight card generated by a co-host or a member granted one-time authority to generate a spotlight card).

In other embodiments, the priority of a spotlight card may be determined based on an interaction level of the spotlight card. For example, if members interact with the spotlight card 334 more often within a predetermined time duration than they interact with the spotlight card 336, then the spotlight card 334 may have a higher priority than the spotlight card 336. If overtime, the spotlight card 334 is interacted with less by members than the spotlight card 336, then the spotlight card 334 may be determined to have a lower priority of the spotlight card 336 and the placement of the spotlight card 334 within the spotlight panel 330 may be changed.

The priority of a spotlight card may be used to determine the placement of the spotlight card within the spotlight panel 330. For example, the higher the priority of a spotlight card, the higher the placement of the spotlight card may be within the spotlight panel 330. A higher placement of the spotlight card may mean that the spotlight card is closer to a focus of the spotlight panel 330. For example, per the illustration of FIG. 3, the further to left within the spotlight panel 330 that a spotlight card is placed, the higher the visibility of the spotlight card may be to members of the chat channel 316. If a spotlight card has a lower priority, then the spotlight card may be placed further to the right within the spotlight panel 330, meaning that the spotlight card may be placed off-screen if there are numerous spotlight cards having a higher priority. As depicted, the spotlight card 332 may have a higher priority than the spotlight card 334, and the spotlight card 334 may have a higher priority than the spotlight card 336.

In still another example, a generating member of a spotlight card may pin a spotlight card at a placement within the spotlight panel 330. The pinning of a spotlight card's placement may supersede any other factors that are used to determine a priority of the spotlight card (e.g., interaction level, time sensitivity). For example, if a host pins the spotlight card 332 in the highest priority placement position (here the furthest to the left within the spotlight panel 330), then the spotlight card 332 may stay in this placement regardless of a determined priority. That is, the spotlight card 332 may stay in the highest priority placement position regardless of if the spotlight card 334 or the spotlight card 336 are determined to have a higher priority.

As noted above, the spotlight panel 330 may be expandable such as to provide a viewing member with an expanded view of the spotlight content of each of the spotlight cards 332, 334, and 336. For example, if the viewing member wanted to see a listing of the lunch options provided by the spotlight card 332, the viewing member may select the expand button 342. Upon selection, the expand button 342 may expand the spotlight panel 330 such as to provide a more detailed view of the spotlight cards 332, 334, and 336.

Figure 4:
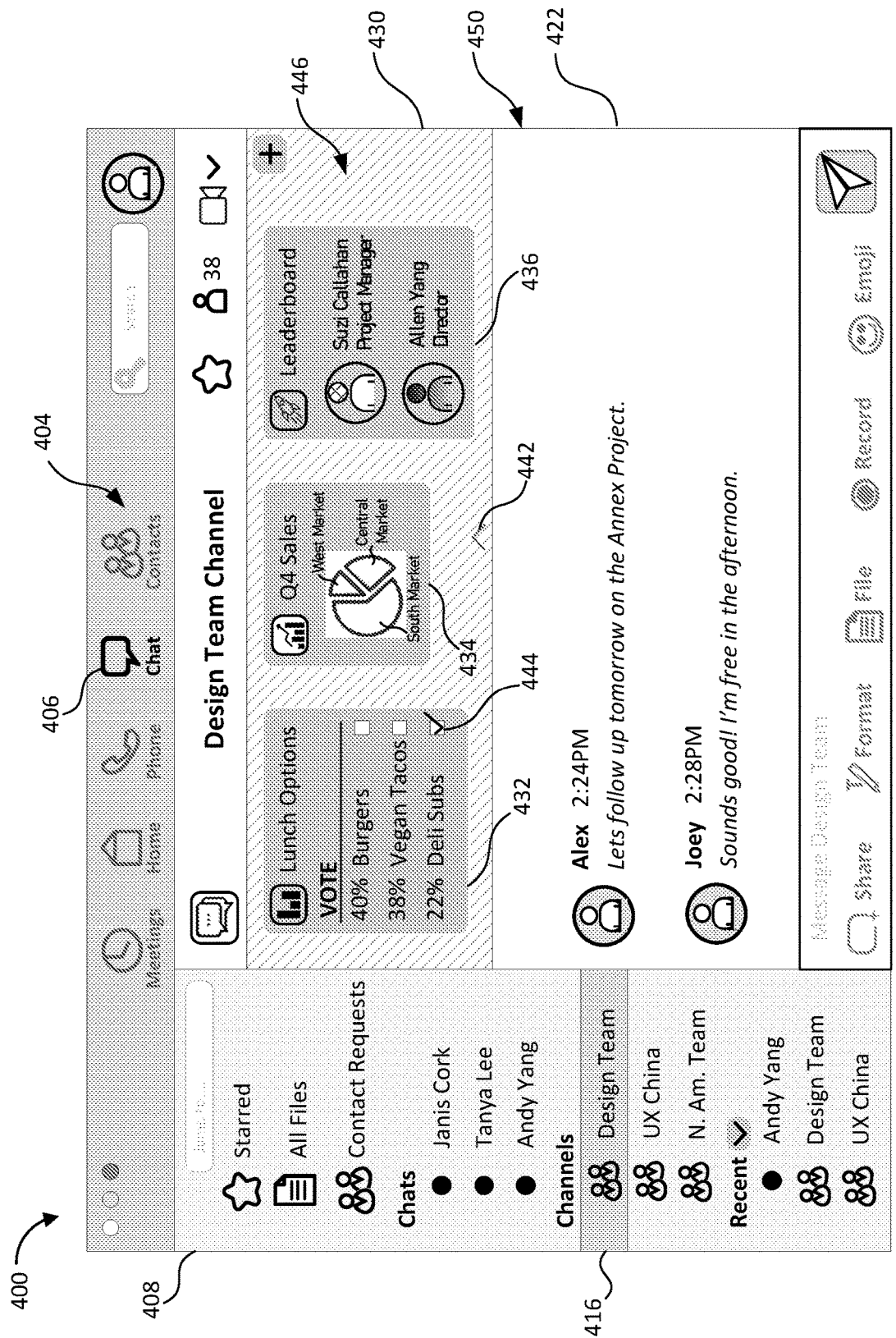
FIG. 4 illustrates an example master chat panel including an expanded spotlight panel, according to an embodiment herein.

Referring now to FIG. 4, an example master chat panel 400 including an expanded spotlight panel 430 is illustrated, according to an embodiment herein. The master chat panel 400 may be the same or similar to the master chat panel 300. Similar numbering is used to indicate the same or similar components of FIGS. 3 and 4. For example, a dashboard 404 may be the same or similar to the dashboard 304, including a chat button 406.

As depicted, a chat channel 416 may be selected via the sidebar 408. The chat channel 416 may be accessed via a chat window 450. The chat window 450 may include a chat messaging panel 422 and a spotlight panel 430, which may be the same or similar to the chat messaging panel 322 and the spotlight panel 330, respectively, discussed with reference to FIG. 3. The spotlight panel 430 may be an expanded view of the spotlight panel 330. For example, the spotlight panel 430 may be larger than the spotlight panel 330. When expanded, the spotlight panel 430 may provide an expanded view of spotlight cards 432, 434, and 436. The spotlight cards 432, 434, and 436 may be the same or similar to the spotlight cards 332, 334, and 336.

In the expanded view, the spotlight cards 432, 434, and 436 may provide information on the spotlight content of a given spotlight card. For example, the spotlight card 432 may provide a listing of the lunch options, whereas the spotlight card 332 in a simplified view shown on FIG. 3 did not provide such a listing. Similarly, the spotlight card 434 may provide a preview of the Q4 sales numbers, whereas the spotlight card 334 did not provide the preview. And finally, the spotlight card 436 may provide the name and title of the leaders on the leaderboard, whereas the spotlight card 336 did not provide this information. In some embodiments, one or more of the spotlight cards 432, 434, or 436 may include historical information of the spotlight card. For example, the spotlight card 432 may include a historical polling result for previous lunch options.

In some embodiments, a spotlight card may be interactive. That is, a member of the chat channel 416 can interact with the spotlight content of a given spotlight card. For example, a viewing member may vote on a lunch option of the spotlight content provided in the spotlight card 332. As depicted, a viewing member may select Deli Subs using a selection 444 within the spotlight card 332. This edit or input by a viewing member from the chat channel 416 may be transmitted to the external resource and update the spotlight content within the external resource. In another example, if the viewing member adds another lunch option such as "Wings" to the listing provided by the spotlight card 432, then the lunch option "Wings" may be added to the lunch options within the external resource, which may be a polling application. A user who may or may not be part of the chat channel 416 who is viewing the lunch options using the polling application, thus not through the chat channel 416, may then see the lunch option "Wings" that was added via the spotlight card 432.

In some embodiments, the spotlight panel 430 may be customizable. That is, a host or other member with authorization to generate spotlight cards, may customize the appearance of the spotlight panel 430. For example, as illustrated, a host may modify or customize the background 446 of the spotlight panel 430. Customizing the spotlight panel 430 may increase the user experience of a chat channel 416 by fitting the spotlight panel 430 to the theme or character of the chat channel 416. If the chat channel 416 is for an environmental project, then the background 446 may be changed to a nature themed picture to set the tone of the chat channel 416. In some embodiments, changing the background 446 of the chat channel 416 may also help orient members as to which chat channel 416 that he or she is in with a visual cue (e.g., a member may recognize the nature background 416 and readily know he or she is in the chat channel 416 for the environmental project).

Customizing the spotlight panel 430 may customize the spotlight panel 430 for all members of the chat channel 416. That is, if a host customizes the spotlight panel 430 by changing the background 446, then the spotlight panel 430 for every member who accesses the chat channel 416 may be visually the same. A member, however, may be able to personally modify the spotlight panel 430 based on his or her preferences such that the spotlight panel 430 has a certain appearance only for that member's view of the chat channel 416.

Figure 5:
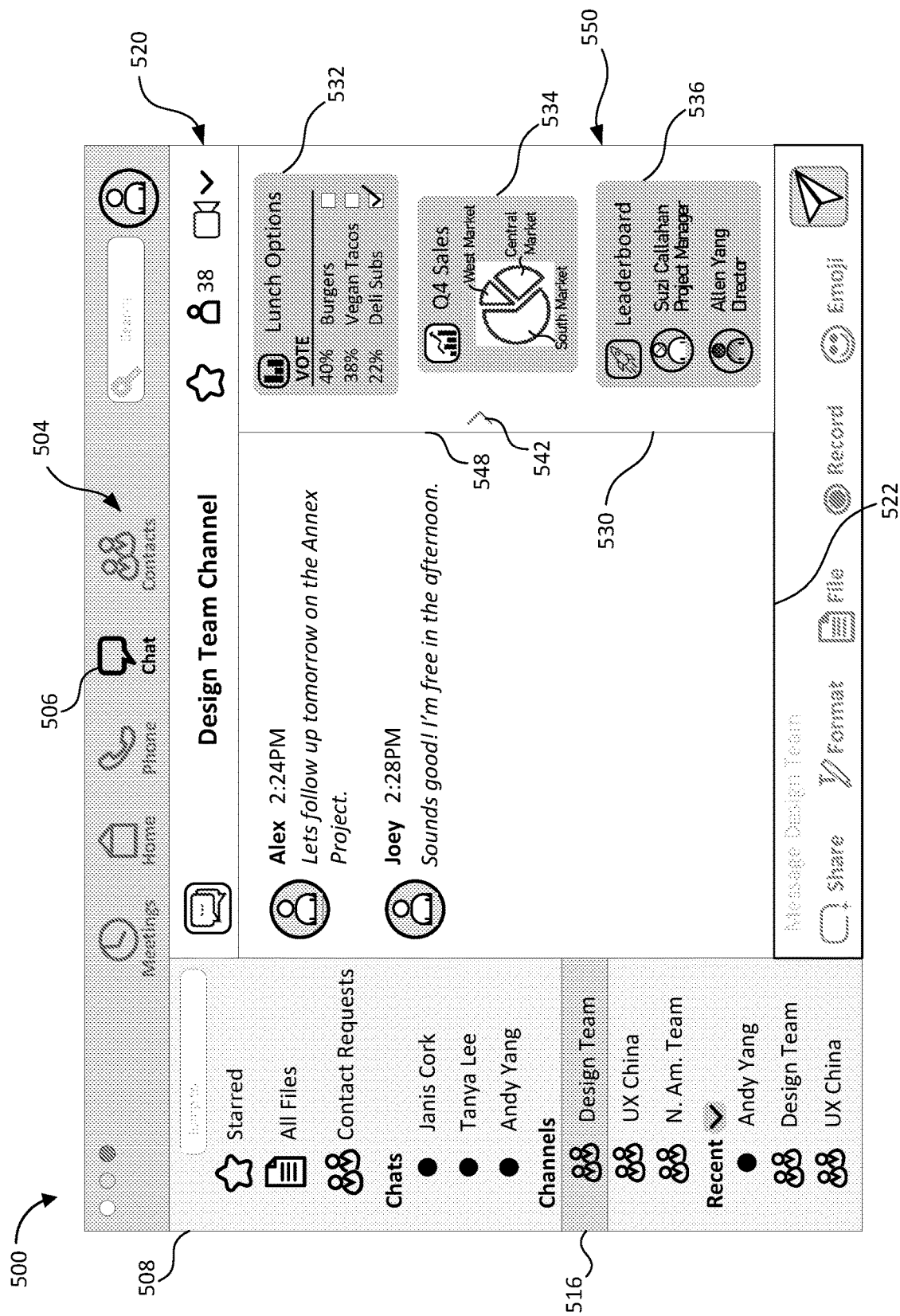
FIG. 5 illustrate another example master chat panel including an expanded spotlight panel, according to an embodiment herein.

Referring now to FIGS. 5, another example master chat panel 500 including an expanded spotlight panel 530 is illustrated, according to an embodiment herein. The master chat panel 500 may be the same or similar to the master chat panels 300 or 400. Similar numbering is used to indicate the same or similar components of FIGS. 3-5. For example, a dashboard 504 may be the same or similar to the dashboard 304 or 404, including a chat button 506.

As depicted, a chat channel 516 may be selected via the sidebar 508. The chat channel 516 may be accessed via a chat window 550. The chat window 550 may include a chat messaging panel 522 and a spotlight panel 530, which may be the same or similar to the chat messaging panel 322 or 422, and the spotlight panel 330 or 430, respectively, as discussed with reference to FIGS. 3 and 4. The spotlight panel 530 may be an expanded view of the spotlight panel 330. For example, the spotlight panel 530 may be larger than the spotlight panel 330. As discussed above, when expanded, the spotlight panel 530 may provide an expanded view of spotlight cards 532, 534, and 536. The spotlight cards 532, 534, and 536 may be the same or similar to the spotlight cards 432, 434, and 436, respectively.

As illustrated, the spotlight panel 530 may be repositioned to be on the right-hand side of the chat messaging panel 522. A member of the chat channel 516 may personalize a position and size of the spotlight panel 530. That is, the member can reposition the spotlight panel 530 and resize the spotlight panel 530 as desired when within the chat channel 516. When a member personalizes the position and size of the spotlight panel 530, the positioning and size of the spotlight panel 530 may be specific to that member's display of the chat channel 516. The spotlight panel 530 may remain in an original position and size on the other members' chat channel 516 display, depending on each other member's personalization of the spotlight panel 530.

To reposition or resize the spotlight panel 530, a viewing member may select the spotlight panel 530 and move the spotlight panel 530 around the master chat panel 500 as desired. For example, the viewing member may select the edges 548 of the spotlight panel 530 to change the size of the spotlight panel 530 or move the position of the spotlight panel 530. Those skilled in the art may readily appreciate the various methods that can be used to resize or reposition the spotlight panel 530. As the spotlight panel 530 is resized or repositioned, the spotlight cards 532, 534, and 536 may change sizes or positions to fit the spotlight panel 530. In some embodiments, the spotlight cards 532, 534, and 536 may maintain their placement within the spotlight panel 530 based on priority of each card.

Figure 6:
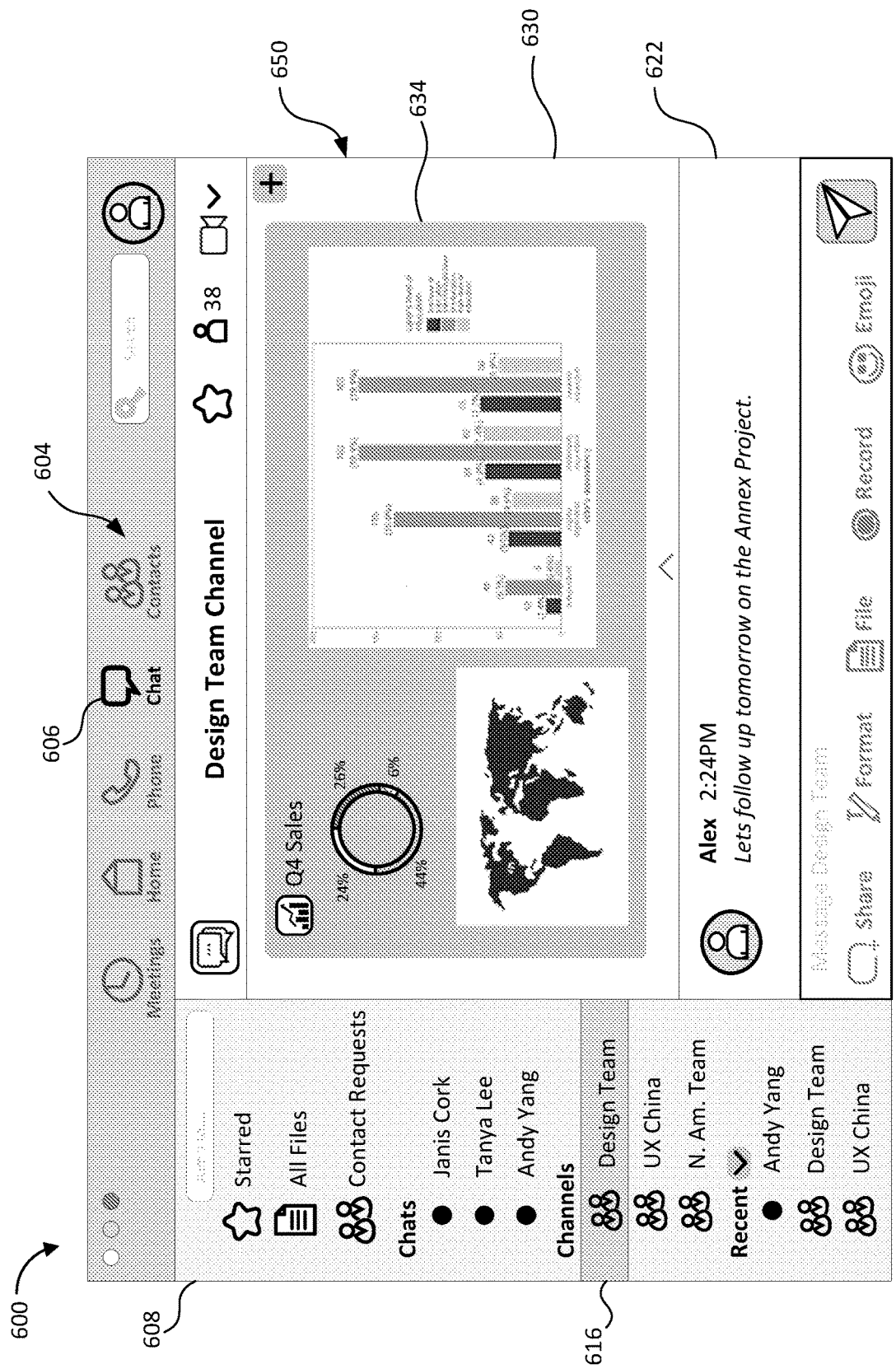
FIG. 6 illustrates an example master chat panel having a detailed view of a spotlight card, according to an embodiment herein.

Referring now to FIG. 6, an example master chat panel 600 having a detailed view of a spotlight card 634 is provided, according to an embodiment herein. The master chat panel 600 may be the same or similar to the master chat panels 300, 400, or 500. Similar numbering is used to indicate the same or similar components of FIGS. 3-6. For example, a dashboard 604 may be the same or similar to the dashboard 304, 404, or 504, including a chat button 606.

As depicted, a chat channel 616 may be selected via the sidebar 608. The chat channel 616 may be accessed via a chat window 650. The chat window 650 may include a chat messaging panel 622 and a spotlight panel 630, which may be the same or similar to the chat messaging panel 322, 422, or 522, and the spotlight panel 330, 430, or 530, respectively, as discussed with reference to FIGS. 3-5.

The spotlight panel 630 may be expanded such as to provide a detailed view of the spotlight card 634, which may be the same or similar to spotlight card 334. For example, the spotlight panel 630 may be larger than the spotlight panel 330. To access the detailed view of the spotlight card 634, a member may select the spotlight card 334 or may expand the spotlight panel 630 until the detailed view of the spotlight card 334 is provided.

When providing a detailed view, the spotlight card 634 may provide more details of the spotlight content than the expanded view or simplified view of the spotlight card 634. As illustrated, when providing the detailed view, the spotlight card 634 may provide more spotlight content than the expanded view of the spotlight card 534 or the simplified view of the spotlight card 334. The detailed view can allow a member to review details of the spotlight content from the spotlight card 634 without leaving the chat channel 616. This can allow a member to continue communicating with the other chat channel members in the chat messaging panel 622 while having access to the spotlight content of a desired external resource via the spotlight card 634. For example, if another member in the chat channel 616 request specific information from a finance application associated with the spotlight card 634, a member does not have to leave the chat channel 616 to access and review the requested information in the finance application. Instead, the member can select the spotlight card 634 and review the spotlight content in the detailed view.

In some embodiments, a member can edit the spotlight content of the external resource from the spotlight card 634. For example, if the member receives the latest project updates via the chat messaging panel 622, the member can update the Q4 sales information in the finance application without leaving the chat channel 616. That is, the member can select and edit the spotlight content of the finance application from the spotlight card 634. Again, this can allow chat channel members to access and edit content from external resources without leaving the chat channel.

In some embodiments, the amount of spotlight content provided to a member via the spotlight card 634 may depend on the permissions level of the member. Specifically, the permissions level of the member with respect to the external resource. For example, if the finance application associated with the spotlight content of the spotlight card 634 requires a subscription, then the amount of spotlight content that a member can view via the spotlight card 634 may depend on that member's subscription status with the finance application. In some embodiments, the amount of spotlight content may be based on the generating member's subscription status. For example, if the member who generates the spotlight card 634 has a subscription, then there may not be a limit to the spotlight content provided on the spotlight card 634, regardless of the other members' subscription status. In contrast, in another embodiment, if a viewing member does not have a subscription to the finance application, then the viewing member may only be provided a preview of the spotlight content on the spotlight card 634. It should be appreciated that subscription status may also include a permissions level or access level to an external resource.

Figure 7:
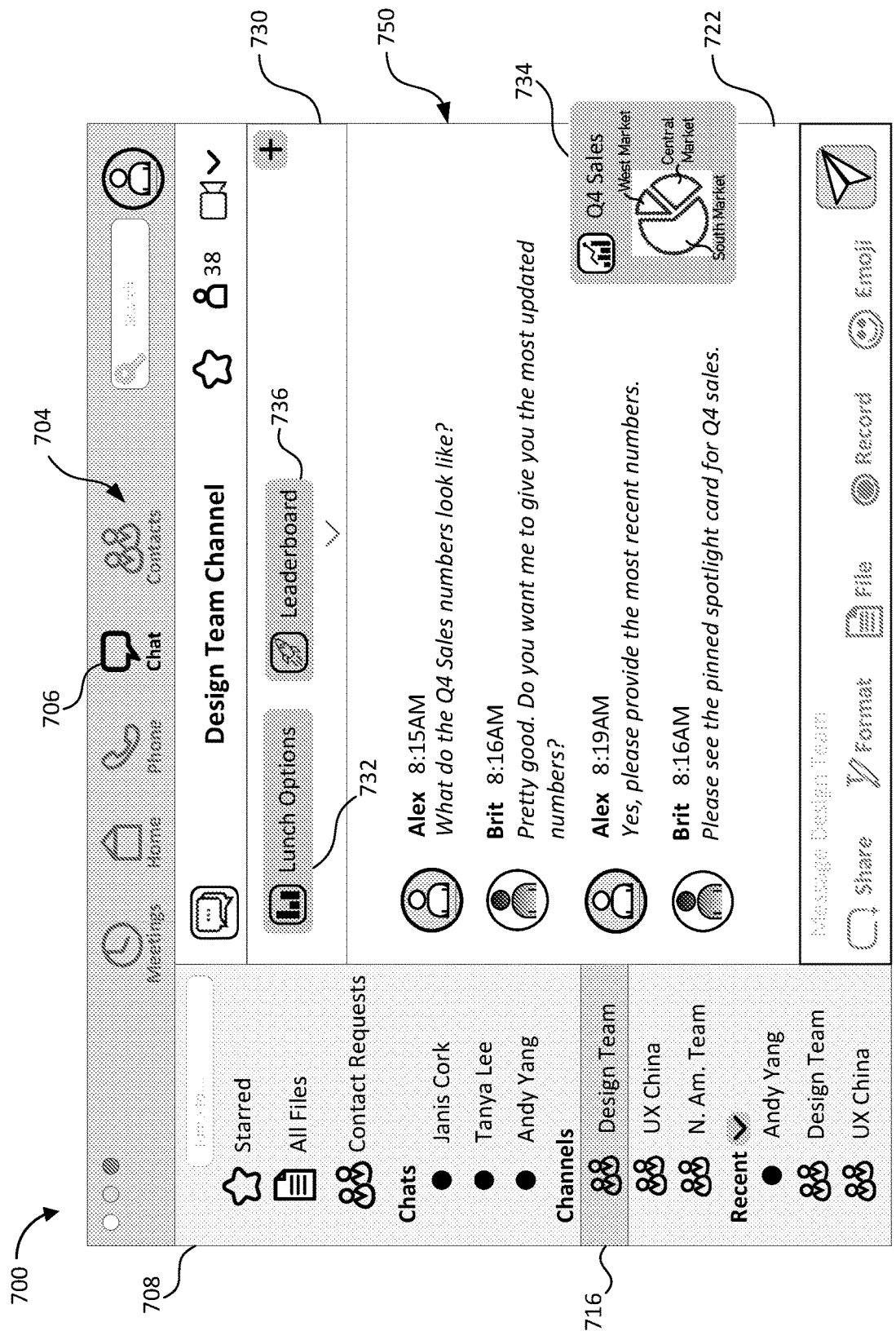
FIG. 7 illustrates an example master chat panel including a floating spotlight card, according to an embodiment herein.

Referring now to FIG. 7, an example master chat panel 700 including a floating spotlight card 734 is illustrated, according to an embodiment herein. The master chat panel 700 may be the same or similar to the master chat panels 300-600. Similar numbering is used to indicate the same or similar components of FIGS. 3-7. For example, a dashboard 704 may be the same or similar to the dashboard 304, 404, 504, or 604, including a chat button 706.

As depicted, a chat channel 716 may be selected via the sidebar 708. The chat channel 716 may be accessed via a chat window 750. The chat window 750 may include a chat messaging panel 722 and a spotlight panel 730, which may be the same or similar to the chat messaging panel 322, 422, 522, or 622, and the spotlight panel 330, 430, 530, or 630, respectively, as discussed with reference to FIGS. 3-6.

In some embodiments, a member may create a floating spotlight card 734. As noted above, a member can personalize the size and position of the spotlight panel 730. Similarly, a member can personalize the size and position of a spotlight card, such as creating a floating spotlight card 734. A floating spotlight card 734 may be a spotlight card that is positioned or placed outside of the spotlight panel 730, such as next to content within the chat messaging panel 722. In some embodiments, a member may pin or fix the floating spotlight card 734 next to a chat message within the chat messaging panel 722, meaning that the floating spotlight card 734 may remain next to the identified chat message regardless of where the member navigates to within the chat messaging panel 722.

In another embodiment, instead of a member personalizing a spotlight card to generate the floating spotlight card 734, including pinning the floating spotlight card 734 proximate to content within the chat messaging panel 722, a host or other authorized member of the chat channel 716 may generate the floating spotlight card 734. When the host or other authorized member generates the floating spotlight card 734, then the floating spotlight card 734 may be present for all members of the chat channel 716. For example, if the host pins the floating spotlight card 734 within the chat messaging panel 722 next to another member's request for the most recent finance numbers, then the floating spotlight card 734 may be pinned next to that chat message on all members' chat messaging panel 722. This can allow the relevant spotlight cards to be placed and remain next to relevant content within the chat messaging panel 722. In some embodiments, the floating spotlight card 734 may remain in the pinned position until returned to the spotlight panel 730.

In some embodiments, a chat channel member may be a multi-channel member involved in multiple chat channels. As such, the multi-channel member may be exposed to a high volume of messages and content from the various chat channels. Even if relevant or important content is highlighted in a spotlight window for each chat channel, the multi-channel member may still miss important content if he or she does not access each of the individual chat channels to review the spotlight cards.

Figure 8:
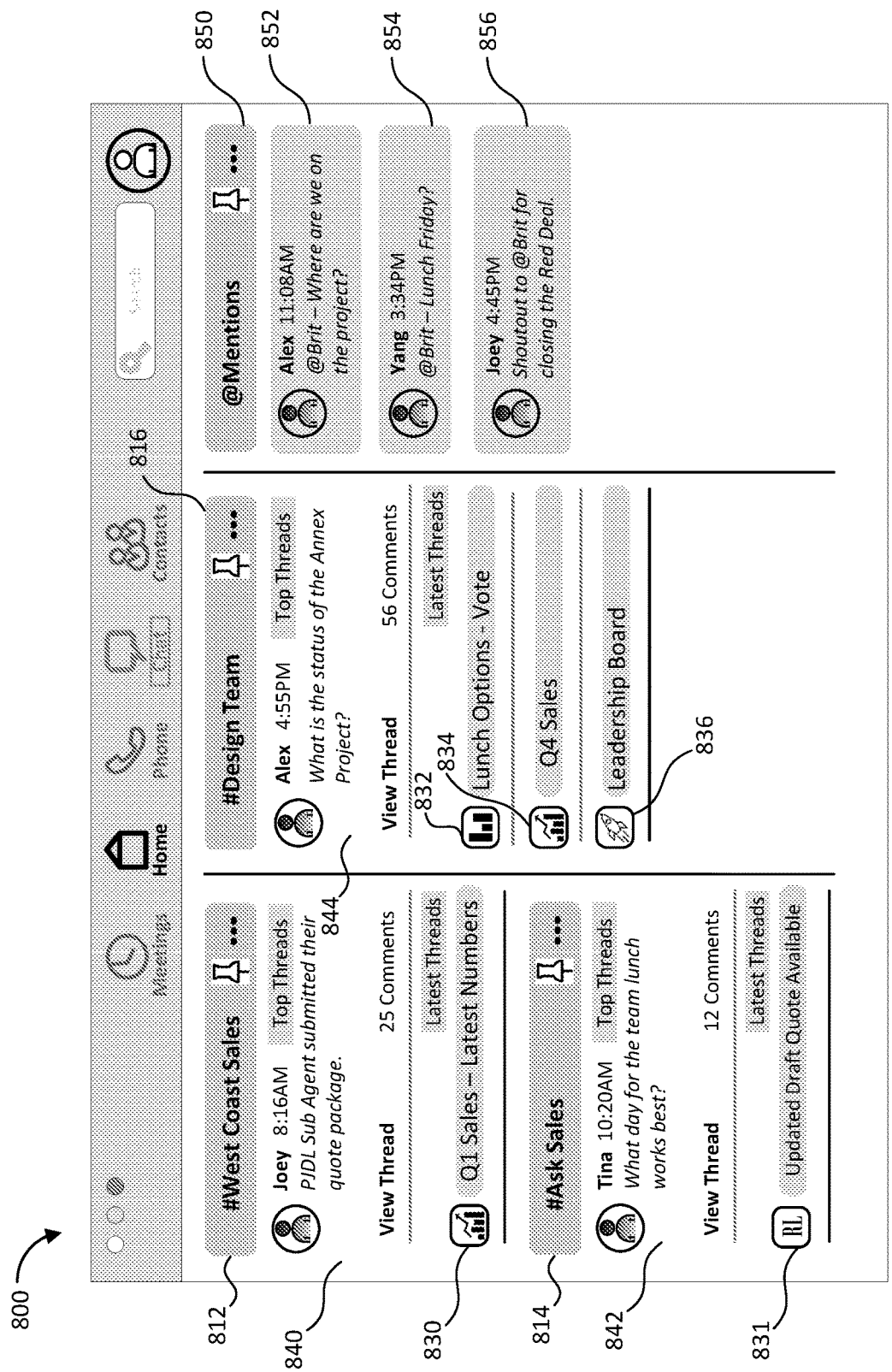
FIG. 8 illustrates an example home panel, according to an embodiment herein.

To provide multi-channel members easy access and review of spotlight cards and relevant information within multiple chat channels, a spotlight home page may be provided. Referring now to FIG. 8, an example spotlight home panel 800 is provided, according to an embodiment herein. The spotlight home panel 800 may aggregate spotlight cards from different chat channels that a given user is a member in a simple display for quick and easy review by the multi-channel member. For example, per the illustrated example, a multi-channel member may be part of a chat channel 812, a chat channel 814, and a chat channel 816. The spotlight home panel 800 can allow the multi-channel member to customize how he or she views respective content from each of the chat channel 812, 814, and 816, and in some cases, share the spotlight home panel 800 or the content therein with other members.

For each of the chat channels 812, 814, and 816, the spotlight cards from each respective channel may be provided on the spotlight home panel 800. For example, the spotlight card 830 may be provided for the chat channel 812, the spotlight card 831 may be provided for the chat channel 814, and the spotlight cards 832, 834, and 836 may be provided for the chat channel 816. The chat channel 816 may be the same or similar to the chat channel 316, and the spotlight cards 832, 834, and 836 may be the same or similar to the spotlight cards 332, 334, or 336, respectively. The spotlight cards 830 and 831 may be similar to the spotlight cards 332, 334, or 336. For example, the spotlight cards 830-836 may update in real-time as the spotlight cards update in the respective chat channels. Additionally, the multi-channel member may be able to interact with the spotlight cards, as discussed above, by for example, expanding each spotlight card to an expanded view or detailed view. The multi-channel member can also edit the spotlight content of the spotlight cards 830-836 as described above.

Additionally, the spotlight home panel 800 may identify and display content in each chat channel that is relevant to the multi-channel member. For example, the spotlight home panel 800 may identify and display spotlight threads 840, 842, and 844 (e.g., a thread having a high number of replies or messages), or messages 852, 854, and 856 that mention the multi-channel member. As depicted, the chat channel 812 may have a spotlight thread 840 which has a high number of messages or comments within that thread. Similarly, the chat channel 814 may include a spotlight thread 842 and the chat channel 816 may include a spotlight thread 844. A spotlight thread may be determined if the comments of a thread exceed a threshold number of comments or if it's a thread with the most recent comments. In some embodiments, the multi-channel member may indicate that any threads containing comments by a selected member should be identified as a spotlight thread. For example, if the team lead comments on any thread within the chat channel 816, then that thread may be determined to be a spotlight thread and the thread may be provided on the spotlight home panel 800.

In some embodiments, content of a chat channel that references the multi-channel member may be highlighted on the spotlight home panel 800. For example, a mentions panel 850 may be provided on the spotlight home panel 800. The mentions panel 850 may include messages 852, 854, and 856 which each include a mention or reference to the multi-channel member. By providing each of these messages 852, 854, and 856 on the spotlight home panel 800, the multi-channel member can be notified of the mention and have easy access to respond to the message if desired.

In some embodiments, the multi-channel member can respond to or interact with any of the spotlight threads 840-844 or messages 852-856 from the spotlight home panel 800. In other embodiments, the multi-channel member can select the spotlight threads 840-844 or messages 852-856 and be automatically directed to the associated chat channel, specifically to the selected content within the associated chat channel. For example, if the multi-channel member selects the message 852, and the message 852 is from the design team chat channel 816, then upon selection the multi-channel member may be directed to the message 852 within the chat channel 816.

Figure 9:
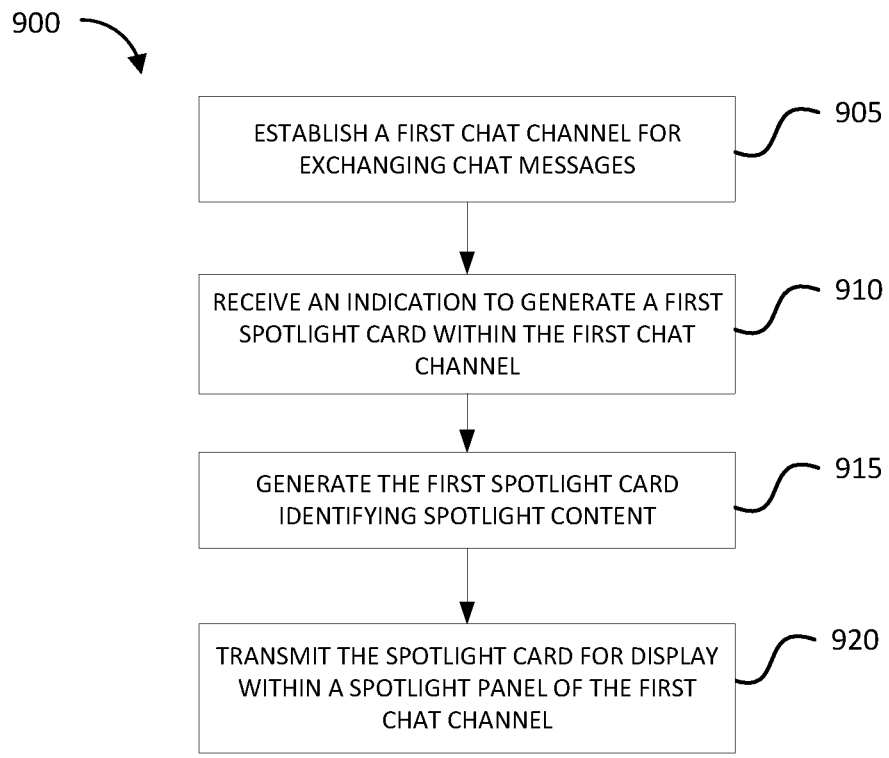
FIG. 9 illustrates an exemplary method for providing spotlight cards within a chat channel, according to an embodiment herein.

Referring now to FIG. 9, a flowchart of an example method 900 for providing spotlight cards within a chat channel is provided. The description of the method 900 in FIG. 9 will be made with reference to FIGS. 3-8, however any suitable system according to this disclosure may be used, such as the example systems 100 and 200, shown in FIGS. 1 and 2.

The method 900 may include steps 905 and 910. At step 905, a first chat channel for exchanging chat messages between client devices may be established. For example, the chat and video conference provider 210 may establish the chat channel 316 between a plurality of client devices, such as the client devices 220-250.

At step 910, an indication to generate a first spotlight card within the first chat channel may be received. For example, the chat and video conference provider 210 may receive an indication to generate a first spotlight card, such as the spotlight card 332, within the first chat channel, such as the chat channel 316. The indication may identify spotlight content from a first resource external to the first chat channel. Example resources external to a chat channel may include an application external to the video conference provider, an application hosted by the video conference provider, or one or more features native to the video conference provider. In some embodiments, prior to generating the first spotlight card, the video conference provider may determine an authorization setting associated with the first client device for the first chat channel. Then, the video conference provider may generate the first spotlight card based on the authorization settings associated with the first client device.

The method 900 may also include steps 915 and 920. At step 915, a first spotlight card may be generated. The first spotlight card may identify the spotlight content. In some embodiments, step 915 may further include accessing the first resource external to the first chat channel, identifying the spotlight content responsive to the indication to generate the first spotlight card, and generating the first spotlight card based on the spotlight content from the first resource external to the first chat channel. At step 920, the first spotlight card may be transmitted to one or more of the client devices connected to the first chat channel for display within a spotlight panel of the first chat channel. The spotlight panel may be positioned proximate to a chat messaging panel including chat messages posted to the first chat channel.

In some embodiments, the method 900 may further include updating, by the video conference provider, the first spotlight card within the spotlight panel. For example, the video conference provider may receive updated spotlight content from the first resource external to the first chat channel and update the first spotlight card with the updated spotlight content. In another example, the video conference provider may receive a selection of the first spotlight card within the spotlight panel and provide a detailed view of the first spotlight card to the first client device. In still another example, one or more edits to the spotlight content of the first spotlight content may be received from a first client device and the video conference provider may update the spotlight content of the first spotlight card based on the one or more edits. In still a further example, the first spotlight card may be modified to visually indicate a status change of an application corresponding to the first resource external to the first chat channel.

In some embodiments, generating the first spotlight card of step 915 may include establishing a placement in the first chat channel for the first spotlight card. In such cases, the method 900 may further include receiving, by the video conference provider, an indication to pin the first spotlight card proximate to content in the chat messaging panel, changing, by the video conference provider, the placement of the first spotlight card from the spotlight panel to a position proximate to the content in the chat messaging panel, and pinning, by the video conference provider, the first spotlight card to the position proximate to the content in the chat messaging panel such that the first spotlight card remains in the position proximate to the content in the chat messaging panel until a removal indication is received.

In some embodiments, the method 900 may further include receiving, by the video conference provider, an indication to generate a second spotlight card within the first chat channel. The second spotlight card may include second spotlight content from a second resource external to the first chat channel. The second resource may be different than the first resource associated with the first spotlight card. Responsive to the indication, the video conference provider may generate the second spotlight card identifying the second spotlight content from the second resource and transmit the second spotlight card to one or more client devices of the first chat channel for display within the spotlight panel. Optionally, a first priority of the first spotlight card and a second priority of the second spotlight card may be determined and a placement of the first spotlight card within the spotlight panel may be modified based on the first priority or the second priority. As described above, the first priority and second priority may be determined by a first interaction level for the first spotlight card and a second interaction level for the second spotlight card, respectively. The first interaction level and the second interaction level may be compared to determine the first priority and the second priority.

Method 900 may further include receiving, from a first client device, an indication to modify the spotlight panel, modifying, by the video conference provider, the spotlight panel based on the indication, and modifying, by the video conference provider, the first spotlight card within the spotlight panel based on the modification of the spotlight panel. For example, the video conference provider may expand the first spotlight card to provide a detailed view of the spotlight content of the first spotlight card.

In some embodiments, the method 900 may further include receiving, from a first client device, an indication to move the first spotlight card from the first chat channel, wherein the plurality of client devices comprise the first client device, accessing, by the first client device, a second chat channel, wherein the second chat channel is established by the video conference provider, receiving, from the first client device, an indication to add the first spotlight card to a second spotlight panel of the second chat channel, and modifying, by the video conference provider, the second spotlight panel of the second chat channel to include the first spotlight card.

Figure 10:
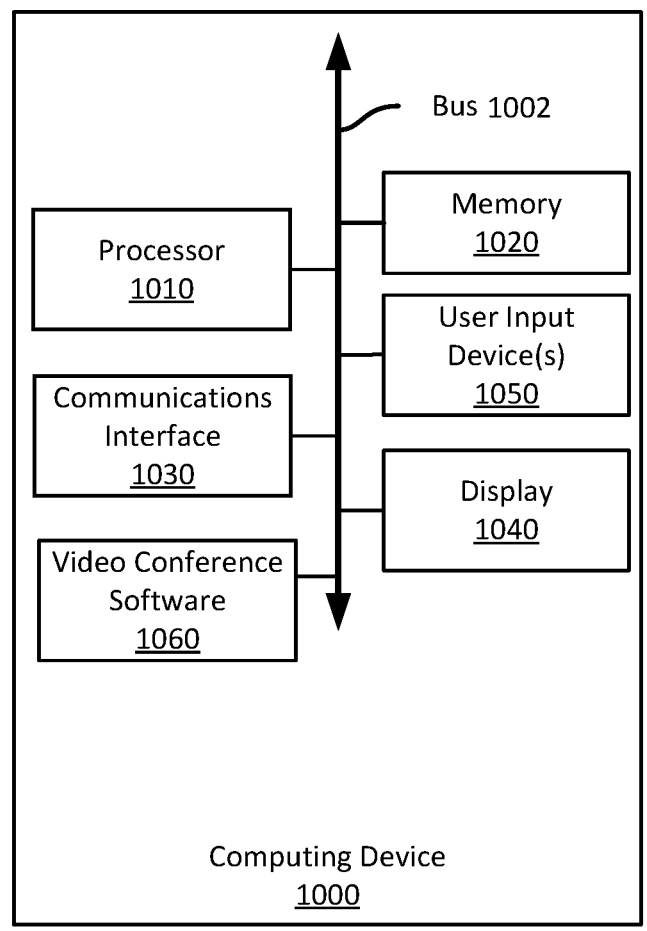
FIG. 10 shows an example computing device suitable for providing spotlight cards within a chat channel, according to this disclosure.

Referring now to FIG. 10, FIG. 10 shows an example computing device 1000 suitable for use in example systems or methods providing spotlight cards within a chat channel. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing spotlight cards within a chat channel, such as part or all of the example method 900, described above with respect to FIG. 9. For example, the video conferencing software 1060 provided on the computing device 1000 may provide instructions for performing one or more steps of the method 900 for providing spotlight cards within a chat channel. The computing device, in this example, also includes one or more user input devices 1050, such as a keyboard, mouse, touchscreen, video input device (e.g., one or more cameras), microphone, etc., to accept user input.

The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: establishing, by a video conference provider, a first chat channel for exchanging chat messages between a plurality of client devices; receiving, by the video conference provider, an indication to generate a first spotlight card within the first chat channel, wherein the indication identifies spotlight content from a first resource external to the first chat channel; generating, by the video conference provider, the first spotlight card identifying the spotlight content; and transmitting, by the video conference provider to one or more of the client devices connected to the first chat channel, the first spotlight card for display within a spotlight panel within the first chat channel, the spotlight panel positioned proximate to a chat messaging panel comprising chat messages posted to the chat channel.

Example 2 is the method of any previous or subsequent Example, wherein generating, by the video conference provider, the first spotlight card within the spotlight panel comprises: accessing the first resource external to the first chat channel; identifying the spotlight content responsive to the indication to generate the first spotlight card; and generating the first spotlight card based on the spotlight content from the first resource external to the first chat channel.

Example 3 is the method of any previous or subsequent Example, further comprising updating, by the video conference provider, the first spotlight card within the spotlight panel of the first chat channel.

Example 4 is the method of any previous or subsequent Example, wherein updating, by the video conference provider, the first spotlight card within the spotlight panel comprises: receiving, by the video conference provider, updated spotlight content from the first resource external to the first chat channel; and updating, by the video conference provider, the first spotlight card with the updated spotlight content.

Example 5 is the method of any previous or subsequent Example, wherein updating, by the video conference provider, the first spotlight card within the spotlight panel comprises: modifying the first spotlight card to indicate a status change of an application corresponding to the first resource external to the first chat channel.

Example 6 is the method of any previous or subsequent Example, wherein updating, by the video conference provider, the first spotlight card within the spotlight panel comprises: receiving, from a first client device, a selection of the first spotlight card within the spotlight panel; and providing, by the video conference provider, a detailed view of the first spotlight card to the first client device.

Example 7 is the method of any previous or subsequent Example, wherein updating, by the video conference provider, the first spotlight card within the spotlight panel comprises: receiving, from a first client device, one or more edits to the spotlight content of the first spotlight card within the spotlight panel; and updating, by the video conference provider, the spotlight content of the first spotlight card based on the one or more edits to the spotlight content.

Example 8 is the method of any previous or subsequent Example, wherein generating the first spotlight card identifying the spotlight content comprising establishing a placement in the chat channel for the first spotlight card, and the method further comprising: receiving, by the video conference provider, an indication to pin the first spotlight card proximate to content in the chat messaging panel; changing, by the video conference provider, the placement of the first spotlight card from the spotlight panel to a position proximate to the content in the chat messaging panel; and pinning, by the video conference provider, the first spotlight card to the position proximate to the content in the chat messaging panel such that the first spotlight card remains in the position proximate to the content in the chat messaging panel until a removal indication is received.

Example 9 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, a first chat channel for exchanging chat messages between a plurality of client devices; receive, by the video conference provider, an indication to generate a first spotlight card within the first chat channel, wherein the indication identifies spotlight content from a first resource external to the first chat channel; generate, by the video conference provider, the first spotlight card identifying the spotlight content; and transmit, by the video conference provider to one or more of the client devices connected to the first chat channel, the first spotlight card for display within a spotlight panel within the first chat channel, the spotlight panel positioned proximate to a chat messaging panel comprising one or more chat messages posted to the chat channel.

Example 10 is the system of any previous or subsequent Example, wherein the processor is configured to execute further processor-executable instructions stored in the non-transitory computer-readable medium to: receive, by the video conference provider, an indication to generate a second spotlight card within the first chat channel, wherein: the second spotlight card comprises second spotlight content from a second resource external to the first chat channel; and the second resource is different than the first resource associated with the first spotlight card; generate, by the video conference provider, the second spotlight card identifying the second spotlight content from the second resource; and transmit, by the video conference provider to the one or more of the client devices connected to the first chat channel, the second spotlight card for display within the spotlight panel of the first chat channel.

Example 11 is the system of any previous or subsequent Example, wherein the processor is configured to execute further processor-executable instructions stored in the non-transitory computer-readable medium to: determine, by the video conference provider, a first priority of the first spotlight card; and determine, by the video conference provider, a second priority of the second spotlight card; and modify, by the video conference provider, a placement of the first spotlight card within the spotlight panel based on the first priority and the second priority.

Example 12 is the system of any previous or subsequent Example, wherein: the processor-executable instructions to determine, by the video conference provider, the first priority of the first spotlight card cause the processor to execute further processor-executable instructions stored in the non-transitory computer-readable medium to determine, by the video conference provider, a first interaction level for the first spotlight card; the processor-executable instructions to determine, by the video conference provider, the second priority of the second spotlight card cause the processor to execute further processor-executable instructions stored in the non-transitory computer-readable medium to determine, by the video conference provider, a second interaction level for the first spotlight card; and the processor is configured to execute further processor-executable instructions stored in the non-transitory computer-readable medium to: compare, by the video conference provider, the first interaction level to the second interaction level; and determine, by the video conference provider, the first priority based on the comparison of the first interaction level of the first spotlight card to the second interaction level of the second spotlight card.

Example 13 is the system of any previous or subsequent Example, wherein the indication to generate the first spotlight card within the first chat channel is received from a first client device of the plurality of client devices, and the processor is configured to execute further processor-executable instructions stored in the non-transitory computer-readable medium to: determine, by the video conference provider, an authorization setting associated with the first client device for the first chat channel; and generate, by the video conference provider, the first spotlight card identifying the spotlight content based on the authorization setting associated with the first client device for the first chat channel.

Example 14 is the system of any previous or subsequent Example, wherein the indication to generate the first spotlight card within the first chat channel is received from a first client device of the plurality of client devices, and the processor is configured to execute further processor-executable instructions stored in the non-transitory computer-readable medium to: determine, by the video conference provider, a permissions setting associated with the first client device for the first resource external to the first chat channel; and generate, by the video conference provider, the first spotlight card identifying the spotlight content based on the permissions setting associated with the first client device for the first resource external to the first chat channel.

Example 15 is the system of any previous or subsequent Example, wherein the first resource external to the first chat channel comprises one or more of: an application external to the video conference provider; an application hosted by the video conference provider; or one or more features native to the video conference provider.

Example 16 is a non-transitory computer-readable medium comprising processor-executable instructions configured to cause one or more processors to: establish, by a video conference provider, a first chat channel for exchanging chat messages between a plurality of client devices; receive, by the video conference provider, an indication to generate a first spotlight card within the first chat channel, wherein the indication identifies spotlight content from a first resource external to the first chat channel; generate, by the video conference provider, the first spotlight card identifying the spotlight content; and transmit, by the video conference provider to one or more of the client devices connected to the first chat channel, the first spotlight card for display within a spotlight panel within the first chat channel, the spotlight panel positioned proximate to a chat messaging panel comprising one or more chat messages posted to the chat channel.

Example 17 is the non-transitory computer-readable medium of any previous or subsequent Example, wherein the processor is configured to execute further processor-executable instructions stored in the non-transitory computer-readable medium to: update, by the video conference provider, the first spotlight card within the spotlight panel of the first chat channel.

Example 18 is the non-transitory computer-readable medium of any previous or subsequent Example, wherein the processor-executable instructions to update, by the video conference provider, the first spotlight card within the spotlight panel cause the processor to execute further processor-executable instructions stored in the non-transitory computer-readable medium to: receive, from a first client device, one or more edits to the spotlight content of the first spotlight card within the spotlight panel, wherein the plurality of client devices comprise the first client device; and updating, by the video conference provider, the spotlight content of the first spotlight card based on the one or more edits to the spotlight content.

Example 19 is the non-transitory computer-readable medium of any previous or subsequent Example, wherein the processor-executable instructions to update, by the video conference provider, the first spotlight card within the spotlight panel cause the processor to execute further processor-executable instructions stored in the non-transitory computer-readable medium to: modify, by the video conference provider, the first spotlight card to visually indicate a status change of an application corresponding to the first resource external to the first chat channel.

Example 20 is the non-transitory computer-readable medium of any previous or subsequent Example, wherein the processor is configured to execute further processor-executable instructions stored in the non-transitory computer-readable medium to: receive, from a first client device, an indication to modify the spotlight panel; modify, by the video conference provider, the spotlight panel based on the indication; and modify, by the video conference provider, the first spotlight card within the spotlight panel based on the modification of the spotlight panel.

Example 21 is the non-transitory computer-readable medium of any previous or subsequent Example, wherein the processor-executable instructions to modify, by the video conference provider, the first spotlight card within the spotlight panel based on the modification of the spotlight panel cause the processor to execute further processor-executable instructions stored in the non-transitory computer-readable medium to: expand, by the video conference provider, the first spotlight card to provide a detailed view of the spotlight content of the first spotlight card.

Example 22 is the non-transitory computer-readable medium of any previous or subsequent Example, wherein the processor is configured to execute further processor-executable instructions stored in the non-transitory computer-readable medium to: receive, from a first client device, an indication to move the first spotlight card from the first chat channel, wherein the plurality of client devices comprise the first client device; access, by the first client device, a second chat channel, wherein the second chat channel is established by the video conference provider; receive, from the first client device, an indication to add the first spotlight card to a second spotlight panel of the second chat channel; and modify, by the video conference provider, the second spotlight panel of the second chat channel to include the first spotlight card.

That which is claimed is:

1. A method comprising:
    establishing, by a video conference provider, a first chat channel to enable exchanging chat messages between a plurality of client devices;
    receiving, by the video conference provider, an indication to generate a first spotlight card associated with the first chat channel, wherein the indication identifies spotlight content;
    generating, by the video conference provider, the first spotlight card based on the spotlight content; and
    transmitting, by the video conference provider to one or more of the client devices connected to the first chat channel, a portion of the spotlight content associated with the first spotlight card for display within a spotlight panel within the first chat channel and positioned adjacent to a chat messaging panel comprising chat messages posted to the first chat channel.

2. The method of claim 1, wherein generating, by the video conference provider, the first spotlight card within the spotlight panel comprises:
    accessing a first resource external to the first chat channel;
    identifying the spotlight content responsive to the indication to generate the first spotlight card; and
    generating the first spotlight card based on the spotlight content from the first resource external to the first chat channel.

3. The method of claim 1, further comprising updating, by the video conference provider in real-time, the portion of the spotlight content within the spotlight panel of the first chat channel based on a change to the spotlight content.

4. The method of claim 3, wherein updating, by the video conference provider, the portion of the spotlight content within the spotlight panel comprises:
    receiving, by the video conference provider, updated spotlight content; and
    updating, by the video conference provider, the first spotlight card based on the updated spotlight content.

5. The method of claim 3, wherein updating, by the video conference provider, the portion of the spotlight content within the spotlight panel comprises:
    receiving, from a first client device, an indication of a selection of the first spotlight card within the spotlight panel;
    obtaining updated spotlight content based on the indication; and
    transmitting, by the video conference provider, the at least a portion of the updated spotlight content to the first client device.

6. The method of claim 3, wherein updating, by the video conference provider, the first spotlight card within the spotlight panel comprises:
receiving, from a first client device, one or more changes to the spotlight content of the first spotlight card within the spotlight panel; and
updating, by the video conference provider, the spotlight content of the first spotlight card based on the one or more changes to the spotlight content.

7. The method of claim 1, further comprising:
receiving a request for a spotlight home page from a first client device of the plurality of client devices;
identifying a plurality of chat channels associated with a user of the first client device;
accessing a plurality of spotlight cards associated with the plurality of chat channels, the plurality of spotlight cards comprising the spotlight card; and
providing at least a subset of the plurality of spotlight cards to the first client device.

8. A system comprising:
a non-transitory computer-readable medium;
a communications interface; and
one or more processors communicatively coupled to the non-transitory computer-readable medium and the communications interface, the processor configured to execute processor-executable instructions stored in the non-transitory computer-readable medium to:
establish, by a video conference provider, a first chat channel to enable exchanging chat messages between a plurality of client devices;
receive, by the video conference provider, an indication to generate a first spotlight card associated with the first chat channel, wherein the indication identifies spotlight content;
generate, by the video conference provider, the first spotlight card based on the spotlight content; and
transmit, by the video conference provider to one or more of the client devices connected to the first chat channel, a portion of the spotlight content associated with the first spotlight card for display within a spotlight panel within the first chat channel and positioned adjacent to a chat messaging panel comprising chat messages posted to the first chat channel.

9. The system of claim 8, wherein the one or more processors are configured to execute further processor-executable instructions stored in the non-transitory computer-readable medium to:
access a first resource external to the first chat channel;
identify the spotlight content responsive to the indication to generate the first spotlight card; and
generate the first spotlight card based on the spotlight content from the first resource external to the first chat channel.

10. The system of claim 8, wherein the one or more processors are configured to execute further processor-executable instructions stored in the non-transitory computer-readable medium to update, by the video conference provider in real-time, the portion of the spotlight content within the spotlight panel of the first chat channel based on a change to the spotlight content.

11. The system of claim 10, wherein the one or more processors are configured to execute further processor-executable instructions stored in the non-transitory computer-readable medium to:
receive, by the video conference provider, updated spotlight content; and
update, by the video conference provider, the first spotlight card based on the updated spotlight content.

12. The system of claim 10, wherein the one or more processors are configured to execute further processor-executable instructions stored in the non-transitory computer-readable medium to:
receive, from a first client device, an indication of a selection of the first spotlight card within the spotlight panel;
obtain updated spotlight content based on the indication; and
transmit, by the video conference provider, the at least a portion of the updated spotlight content to the first client device.

13. The system of claim 10, wherein the one or more processors are configured to execute further processor-executable instructions stored in the non-transitory computer-readable medium to:
receive, from a first client device, one or more changes to the spotlight content of the first spotlight card within the spotlight panel; and
update, by the video conference provider, the spotlight content of the first spotlight card based on the one or more changes to the spotlight content.

14. The system of claim 8, wherein the one or more processors are configured to execute further processor-executable instructions stored in the non-transitory computer-readable medium to:
receive a request for a spotlight home page from a first client device of the plurality of client devices;
identify a plurality of chat channels associated with a user of the first client device;
access a plurality of spotlight cards associated with the plurality of chat channels, the plurality of spotlight cards comprising the spotlight card; and
provide at least a subset of the plurality of spotlight cards to the first client device.

15. A non-transitory computer-readable medium comprising processor-executable instructions configured to cause one or more processors to:
establish, by a video conference provider, a first chat channel to enable exchanging chat messages between a plurality of client devices;
receive, by the video conference provider, an indication to generate a first spotlight card associated with the first chat channel, wherein the indication identifies spotlight content;
generate, by the video conference provider, the first spotlight card based on the spotlight content; and
transmit, by the video conference provider to one or more of the client devices connected to the first chat channel, a portion of the spotlight content associated with the first spotlight card for display within a spotlight panel within the first chat channel and positioned adjacent to a chat messaging panel comprising chat messages posted to the first chat channel.

16. The non-transitory computer-readable medium of claim 15, further comprising processor-executable instructions configured to cause the one or more processors to update, by the video conference provider in real-time, the portion of the spotlight content within the spotlight panel of the first chat channel based on a change to the spotlight content.

17. The non-transitory computer-readable medium of claim 16, further comprising processor-executable instructions configured to cause the one or more processors to:

receive, by the video conference provider, updated spotlight content; and update, by the video conference provider, the first spotlight card based on the updated spotlight content.

18. The non-transitory computer-readable medium of claim 16, further comprising processor-executable instructions configured to cause the one or more processors to:

receive, from a first client device, an indication of a selection of the first spotlight card within the spotlight panel;

obtain updated spotlight content based on the indication; and transmit, by the video conference provider, the at least a portion of the updated spotlight content to the first client device.

19. The non-transitory computer-readable medium of claim 16, further comprising processor-executable instructions configured to cause the one or more processors to:

receive, from a first client device, one or more changes to the spotlight content of the first spotlight card within the spotlight panel; and update, by the video conference provider, the spotlight content of the first spotlight card based on the one or more changes to the spotlight content.

20. The non-transitory computer-readable medium of claim 15, further comprising processor-executable instructions configured to cause the one or more processors to:

receive a request for a spotlight home page from a first client device of the plurality of client devices;

identify a plurality of chat channels associated with a user of the first client device;

access a plurality of spotlight cards associated with the plurality of chat channels, the plurality of spotlight cards comprising the spotlight card; and provide at least a subset of the plurality of spotlight cards to the first client device.

\* \* \* \* \*